INVENTOR.
ADDISON B. SCHOLES
ATTORNEY

Feb. 9, 1971     A. B. SCHOLES     3,561,940
METHOD AND APPARATUS FOR PREPARING GLASS ARTICLES
Filed Oct. 2, 1967     5 Sheets-Sheet 2

*INVENTOR.*
ADDISON B. SCHOLES
BY
ATTORNEY

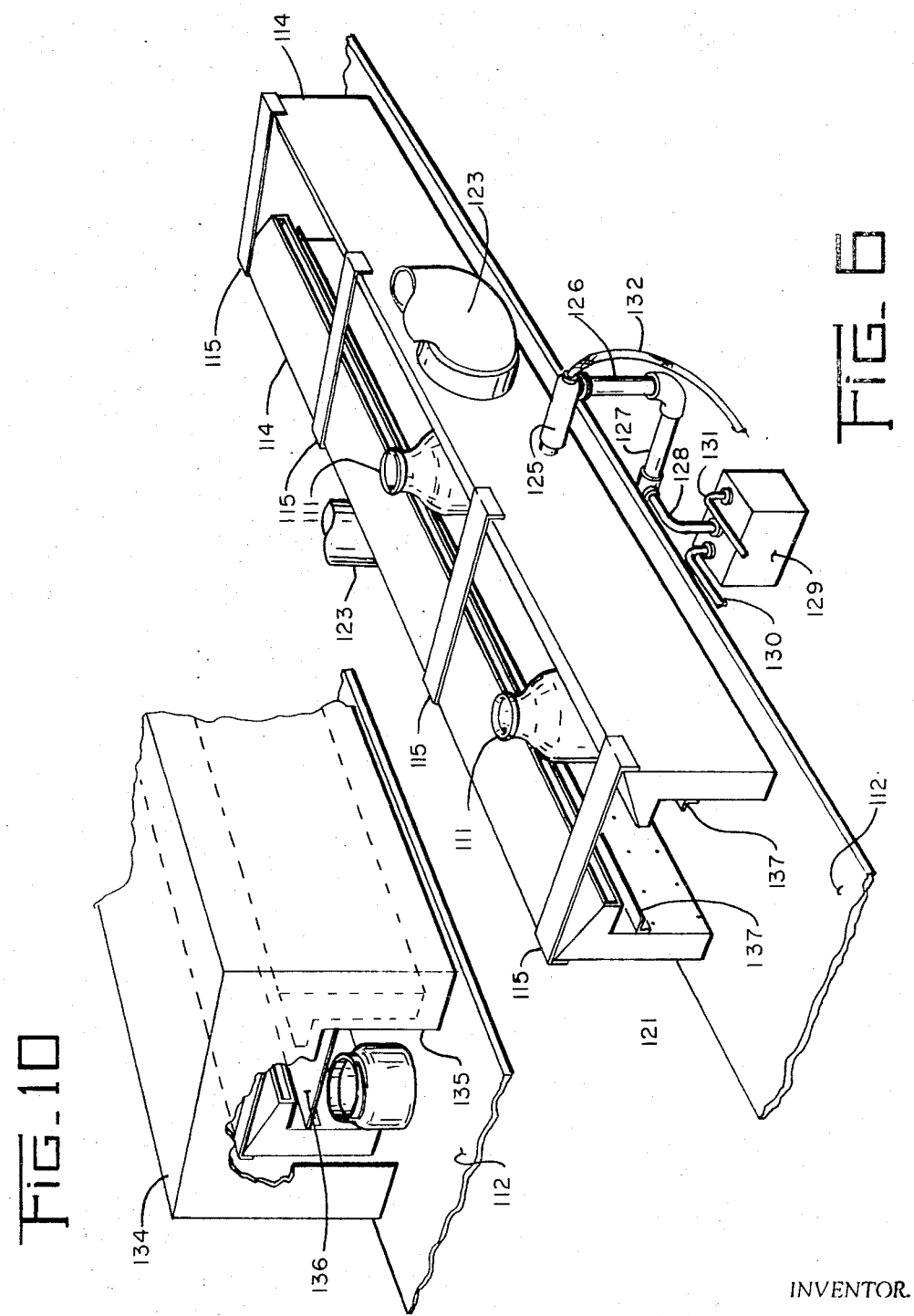

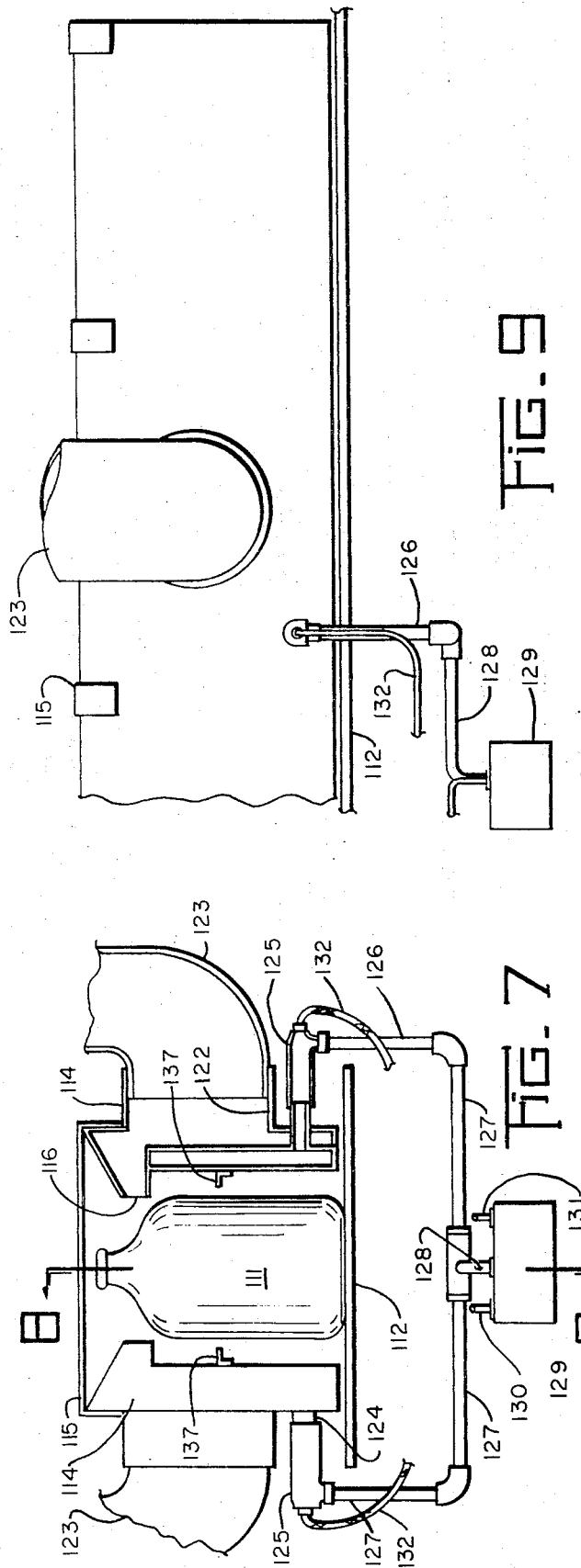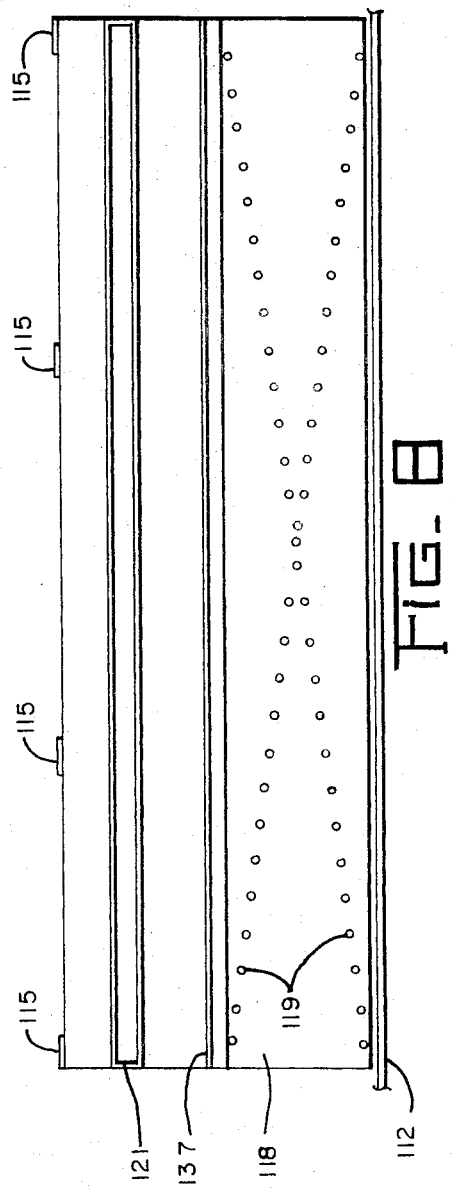

Feb. 9, 1971  A. B. SCHOLES  3,561,940
METHOD AND APPARATUS FOR PREPARING GLASS ARTICLES
Filed Oct. 2, 1967  5 Sheets-Sheet 5
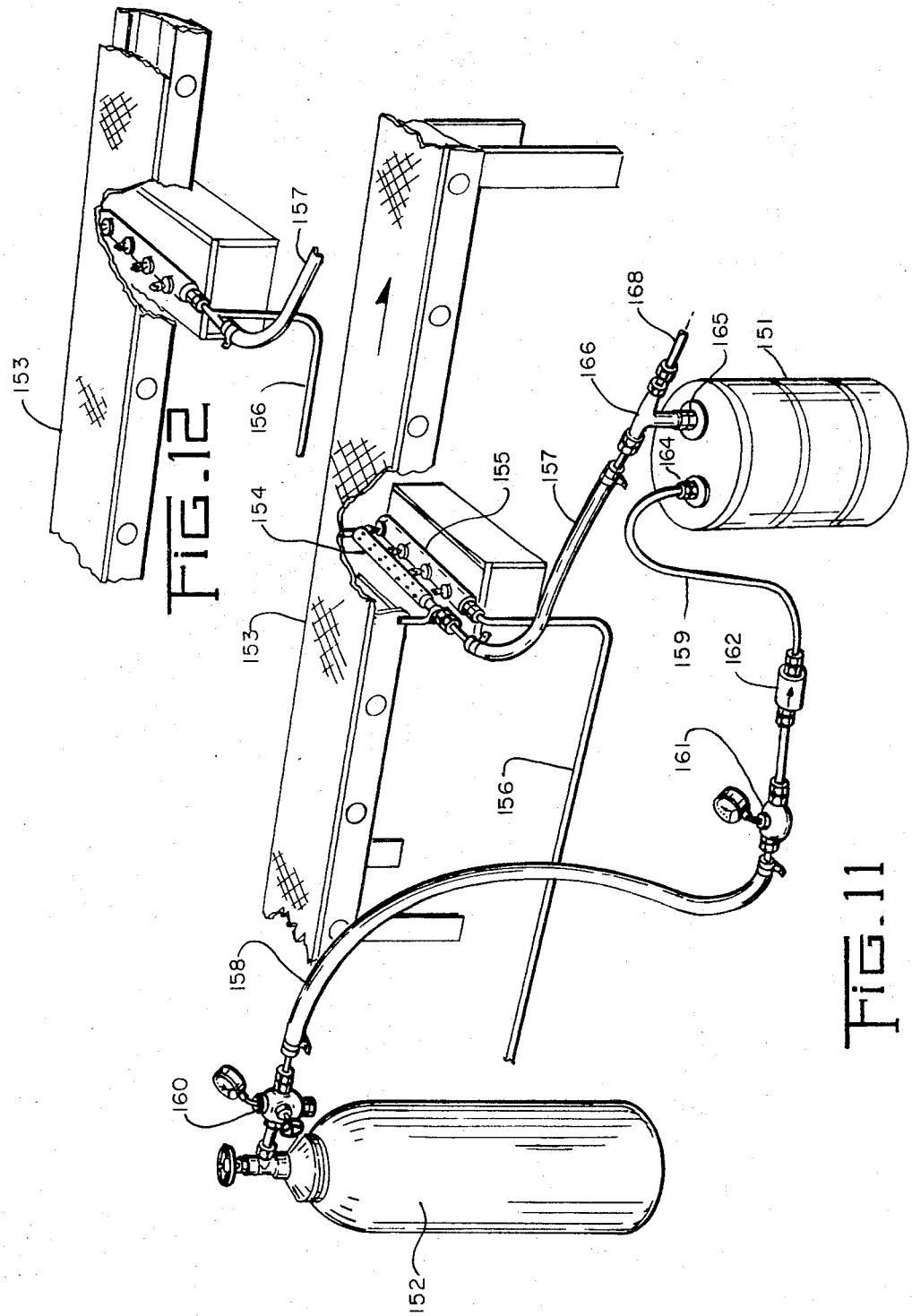
INVENTOR.
ADDISON B. SCHOLES
BY
ATTORNEY

3,561,940
METHOD AND APPARATUS FOR PREPARING GLASS ARTICLES

Addison B. Scholes, Muncie, Ind., assignor to Ball Corporation, a corporation of Indiana
Continuation-in-part of applications Ser. No. 376,073 and Ser. No. 376,243, both June 18, 1964, and Ser. No. 423,629, Dec. 21, 1964, which in turn is a continuation-in-part of application Ser. No. 347,848, Feb. 27, 1964. This application Oct. 2, 1967, Ser. No. 677,492
Int. Cl. C03c 17/00
U.S. Cl. 65—60        8 Claims

ABSTRACT OF THE DISCLOSURE

This invention pertains to a method of treating a virgin vitreous surface to protect against degrading in strength and other properties. Prior to completion of annealing, the vitreous surface is exposed to stannic chloride vapor in an inert carrier to form a colorless coating of tin oxide on the vitreous surface. Articles so treated form a portion of the invention as does treatment of metal glass-contacting surfaces in a similar manner to curtail abrasion of glass when contacted by such coated surfaces.

The invention also pertains to apparatus for carrying out the method by confining the stannic chloride vapor in a hood with means for carrying the vitreous surface therethrough. A particularly useful apparatus includes inlet and exhaust ports to conduct the vapor only over selected portions of the vitreous surface.

---

This invention relates to a novel metal oxide coating for articles and more particularly relates to a new tin oxide coating for glass. Furthermore, the invention relates to a novel method and improved apparatus for producing such coated articles.

This application is a continuation-in-part of applications Ser. Nos. 376,073 and 376,243, both filed June 18, 1964, now abandoned, and application Ser. No. 423,629, filed Dec. 21, 1964, now abandoned, the latter application being in turn a continuation-in-part of application Ser. No. 347,848, filed Feb. 27, 1964, now abandoned.

In the production of glass articles such as bottles, jars, etc., it is customary to transfer the newly-formed jars from a forming machine to an annealing lehr. This generally is accomplished with a conveyor, guide rails, and various types of loading equipment. Since the glass is at a relatively high temperature, e.g., 800° to 1500° F., during the transfer, contact of the glass with the various metal surfaces mentioned above may produce defects in the glass. Such defects result in weakening of the glass which may lead to increased breakage during processing and use. Breakage is a serious problem during processing due to the interruptions caused in continuous processing lines and during use both because of the inconvenience caused to the consumer and also the safety hazard.

Attempts to minimize the formation of defects in newly-formed glass articles have included modification of the handling equipment and the application of various coatings to the newly-formed articles. While some coatings have resulted in a reduction in the number of defects, the coatings have created other problems such as discoloring of the glass or other changes in the appearance thereof, difficulty of application of the coatings, or lack of durability through washing and steam cleaning operations. In addition, many coatings were not acceptable for glassware because they were not approved for use with food or because labels did not tightly adhere to the coated surfaces.

In contrast to the coatings previously proposed, the new and improved coating of the present invention overcomes many of the difficulties previously encountered and in addition, provides benefits and advantages which heretofore were considered unattainable. The coating of the present invention provides a durable, lubricous film on glass, which film can withstand treatment with hot water or steam. Furthermore, the coated glass articles of the invention are unchanged in appearance, and labels adhere tightly to the coated surfaces. Moreover, breakage and other damage and defects are reduced with the coated articles of the invention. In addition, the coating is approved for use with food and thus is not restricted in its application.

The method and apparatus of the invention also overcomes many of the problems of earlier procedures and apparatus used for applying coatings to articles and provides additional benefits and advantages. The apparatus and method of the invention provide for the uniform coating of articles with a minimum of material, simply and conveniently. Furthermore, the apparatus is simple in design and relatively low in cost and can be easily fabricated from commercially available components.

In accordance with the present invention, glass of improved durability and lubricity is formed by subjecting virgin glass to stannic chloride vapor while the glass retains a portion of its heat of formation. The glass article so produced has a very thin, colorless, uniform tin oxide film which is believed to be chemically bonded to the virgin surface of the glass. Virgin glass is newly-formed glass which has not been annealed or had an opportunity to be adversely affected by the elements and which still retains a portion of its heat of formation.

The virgin glass is exposed to stannic chloride vapor while the glass is at a temperature above the decomposition temperature of the stannic chloride but below the solidification temperature of the glass. Advantageously, the glass is between about 900° and 1500° F. and preferably between about 1050° and 1300° F. during treatment.

The stannic chloride vapor is advantageously formed by combining stannic chloride with a suitable carrier gas. Preferably, the gas is dry, that is, substantially moisture-free, e.g., a dew point below about 0° F. Suitable carrier gases include air, nitrogen, argon and similar gases which are inert to stannic chloride in simple admixtures and at the conditions described.

Liquid stannic chloride in its anhydrous form has a high vapor pressure at ambient temperatures so that the stannic chloride vapor employed in the method of the invention may advantageously be formed by passing a gas through or over the surface of the liquid stannic chloride. The concentration of stannic chloride in the vapor is preferably between about 0.01% and 2.5% by weight of the vapor and particularly between about 0.1 and 1.5% by weight. The concentration of the stannic chloride in the vapor may be conveniently adjusted in a number of ways. For example, the flow rate of gas through or over the stannic chloride liquid may be changed, the temperature of the liquid raised or lowered, or varying amounts of additional inert gas may be mixed with the previously-formed vapor to provide the desired concentration of stannic chloride. In some cases, it may be desirable to mix with the stannic chloride liquid prior to the formation of the vapor, an inert liquid having a vapor pressure substantially the same as that of the stannic chloride.

The form of the glass coated in accordance with the invention may vary considerably and may include glass containers, tubing, rods, sheets, window glass, microscope slides, laboratory ware and similar articles in which substantially improved durability and lubricity is desired.

The tin oxide film formed on the glass is very thin and advantageously is less than about one-fourth wavelength of visible light in thickness. As a result, the film is without iridescence and invisible to the eye and does not significantly change the appearance of the article.

The invention will be described in greater detail with reference to the accompanying drawings, in which:

FIG. 6 is a perspective view of another form of apparatus of the invention;

FIG. 7 is an end view partialy in section of the apparatus shown in FIG. 6;

FIG. 8 is a sectional view taken along line 8—8 of FIG. 7;

FIG. 9 is a partial side elevation of the apparatus shown in FIG. 6;

FIG. 10 is a partial perspective view showing a modification of the apparatus shown in FIG. 6;

FIG. 11 is a perspective view of another embodiment of the apparatus of the invention; and FIG. 12 is a partial perspective view of a modified form of the apparatus shown in FIG. 11.

Figure 1:
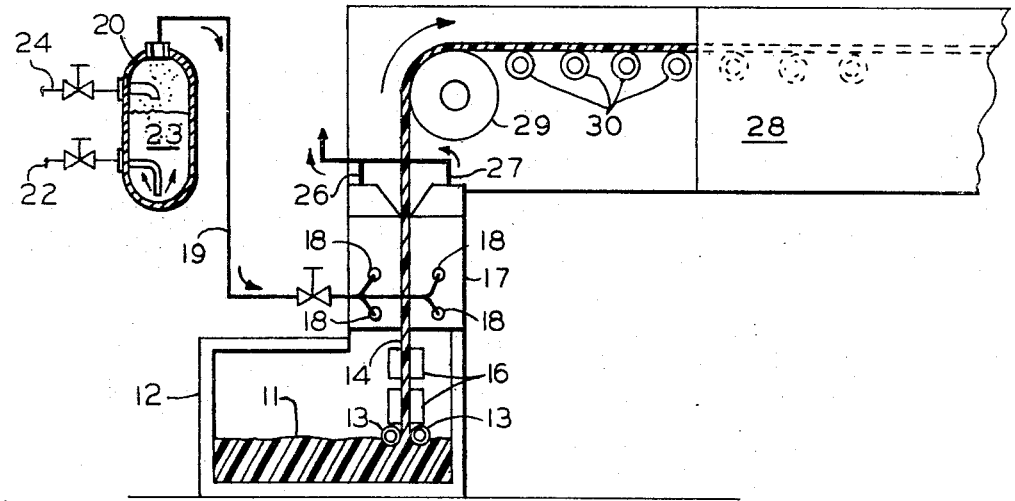
FIG. 1 is a schematic arrangement showing the coating of glass sheets.

As shown in FIG. 1, molten glass 11 in a furnace 12 is drawn between rollers 13 to form a sheet of glass 14. As the glass advances upwardly, it is cooled by coolers 16 and then advances through a chamber 17. Inside the chamber are positioned nozzles 18 on either side of the glass, which nozzles apply stannic chloride vapor to the glass and form a substantially uniform vapor atmosphere in the chamber 17.

The vapor is delivered to nozzles 18 by a supply line 19 from vessel 20. The stannic chloride vapor is formed by passing a dry gas from a line 24 through vessel 20 which contains liquid stannic chloride 23 supplied to the vessel by line 22.

The stannic chloride vapor contacting the surfaces of the glass 14 in chamber 17 decompose to form a colorless, uniform tin oxide film which is tightly bonded to the surface of the glass. The decomposition products formed by the decomposition of the stannic chloride are exhausted from the chamber through ducts 26 and 27. The treated glass sheets are then advanced to an annealing lehr 28 by rollers 29 and 30.

A similar approach can be employed to improve glass formed by the "float" process. Such glass is virgin and in an appropriate state for coating as it leaves the float bath.

Figure 2:
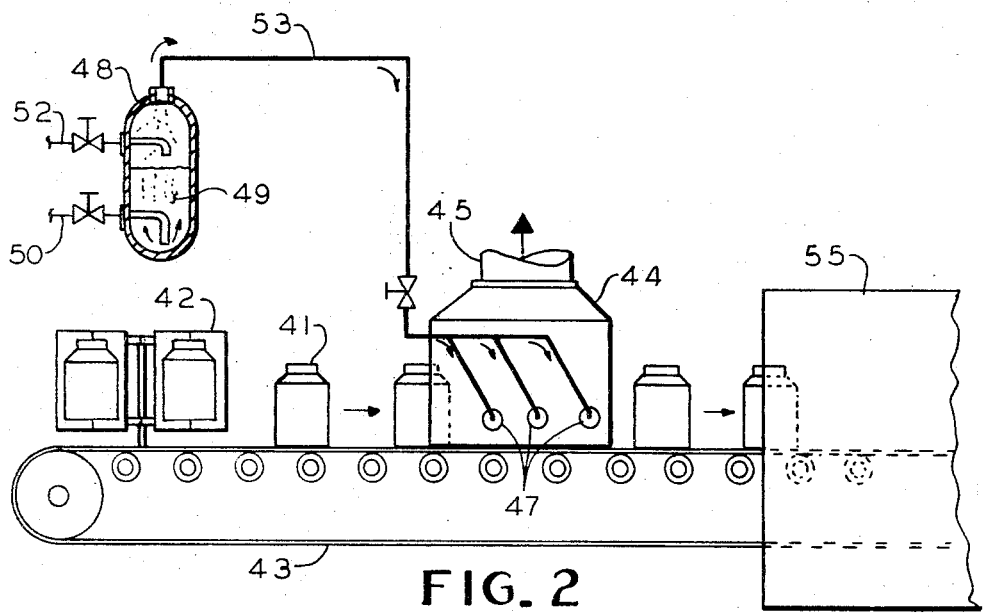
FIG. 2 is a schematic arrangement showing the coating of glass containers.

As shown in FIG. 2, glass containers 41 formed in a mold 42 are advanced on a conveyor 43 through a chamber 44 having an exhaust duct 45. Inside the chamber are positioned a plurality of nozzles 47 which subject the containers moving through the chamber 44 to a substantially uniform atmosphere of stannic chloride vapor. The vapor is formed in a vessel 48 containing liquid stannic chloride 49 through which is passed a suitable dry carrier gas from line 52. The stannic chloride is introduced into the vessel by means of a supply line 50. The stannic chloride vapor formed in the vessel is delivered to nozzles 47 through a delivery line 53. After the glass containers have been exposed to the stannic chloride vapor atmosphere and a colorless tin oxide film formed thereon, the coated containers are advanced by conveyor 43 through a suitable annealing lehr 55.

Figure 3:
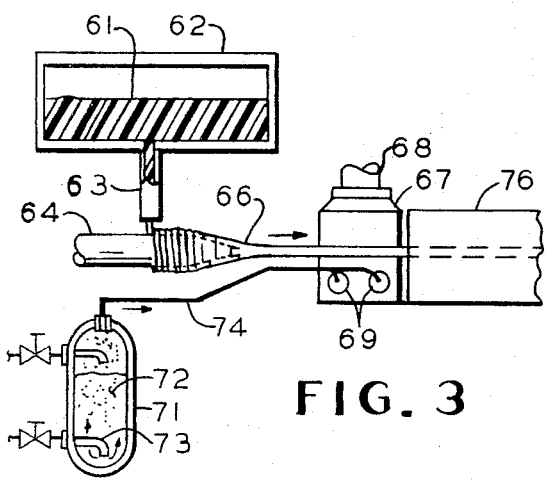
FIG. 3 is a schematic arrangement showing the coating of glass tubing.

In FIG. 3, molten glass 61 in furnace 62 is delivered by spout 63 onto a rotating mandrel 64. The glass is drawn from the end of the mandrel forming glass tubing 66 which is advanced through chamber 67 having an exhaust duct 68. Nozzles 69 are positioned in chamber 67 to introduce stannic chloride vapor into the chamber and subject the tubing 66 advancing therethorugh to a substantially uniform vapor atmosphere. The stannic chloride vapor is formed in a vessel 71 containing liquid stannic chloride 72. A suitable dry carrier gas is bubbled through the liquid stannic chloride from a delivery tube 73 disposed below the surface of the liquid. The resulting stannic chloride vapor is delivered to the nozzles 69 through a line 74. The tin oxide coated glass tubing is passed through an annealing lehr 76 after removal from the coating chamber 67.

Figure 4:
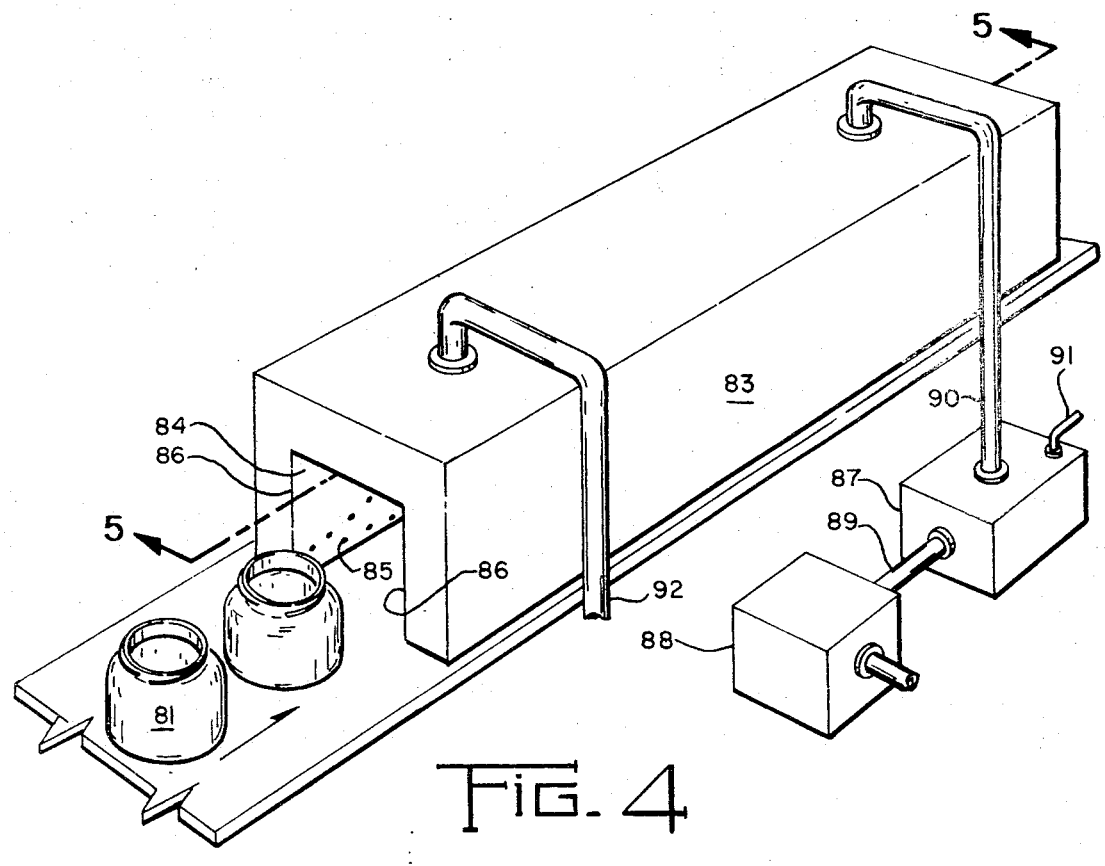
FIG. 4 is a perspective view of one form of apparatus of the invention.

While the above description and FIGS. 1–3 of the drawings illustrate the coating of various glass articles in production lines, it will be apparent that a simple arrangement may be employed where only small quantities of glass are to be coated in accordance with the method of the invention. For example, inert gas from a pressure cylinder may be bubbled through a container of liquid stannic chloride and the resulting vapor applied to one or more glass articles which advantageously may be located within a hood or an enclosed chamber. To provide uniform coating of the glass, the glass and the vapor applicator may be moved relative to each other.

Where a large volume of glass is to be coated over extended periods of time, it is desirable to provide a combination of a coating chamber to uniformly coat the glass and a system for treating the carrier air or gas to remove any moisture or other contaminants therein prior to the formation of the stannic chloride vapor. FIG. 4 of the drawings illustrates one form of such an arrangement.

Figure 5:
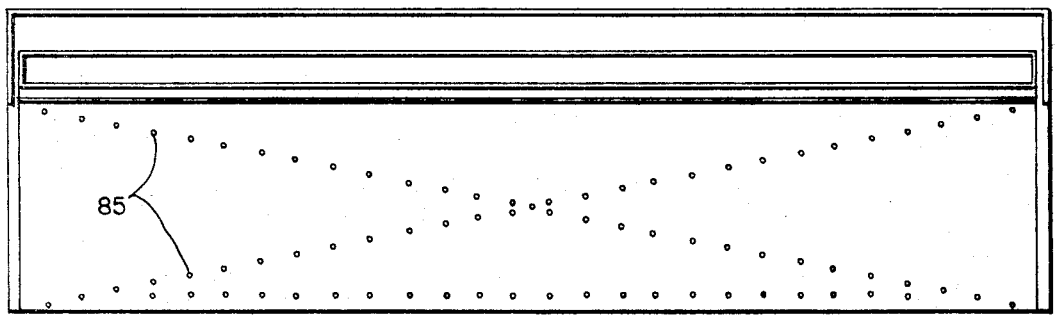
FIG. 5 is a sectional view taken along line 5—5 of FIG. 4.

In FIG. 4, glass containers 81 on conveyor belt 82 pass through a double-walled hood having an exterior shell 83 and an inner shell 84. Inner shell 84 has vertical walls 86 each of which has a plurality of openings 85 to introduce the vapor into the coating chamber. The openings 85 as shown in FIG. 5 may, for example, from an X-shaped pattern with an extra horizontal line of openings disposed a short distance above the conveyor belt 82. Such a pattern provides substantially uniform coating of the glass containers with a slightly heavier coating around the heel of the containers. Stannic chloride vapor is generated in a vessel 87 containing stannic chloride liquid into which is passed dry air from an air drier 88 through pipe 89. Liquid stannic chloride is introduced into vessel 87 through pipe 91. The dry air passing through vessel 87 contacts stannic chloride liquid therein and forms a vapor which passes through pipe 90 into one end of the chamber between outer shell 83 and inner shell 84. At the opposite end of the hood is disposed a second pipe 92 through which may be introduced additional quantities of a gaseous diluent, e.g., compressed air, to mix with the vapor in the chamber and provide the desired concentration of vapor for contact with the containers.

A particularly useful hood construction is shown in FIGS. 6 through 10 of the drawings. The apparatus shown is designed to coat particular portions of the containers while retaining other portions thereof free of coating, e.g., the finish when fire polishing is required.

Glass containers 111 being advanced on a conveyor belt 112 pass through an apparatus having treating sections 114 spaced from each other and positioned above the conveyor belt 112. The sections 114 which are connected by suitable brackets 115 are each divided into upper and lower chambers 116 and 117, respectively. As shown in FIG. 8, each lower chamber 117 has a plurality of openings 119 in its inner sidewall 118. The openings 119 are arranged to provide substantially uniform coating of the containers, and advantageously in a pattern having a plurality of intersecting rows, such as an X-shaped pattern, as shown in FIG. 8.

The upper chamber 116 of each section 114 has a longitudinal slot or opening 121 which extends inwardly toward the center line of the conveyor 112. Each upper chamber 116 has an exhaust opening 122 to which is connected a duct 123.

The treating vapor to be applied to the containers moving through the tunnel, as shown in the FIGS. 6-9, may be introduced into the lower treating chambers 117 through inlets 124 by an arrangement of pipes and tubes 125, 126, 127, and 128 from a suitable storage vessel 129. Advantageously, a diluent gas may be mixed with the treating vapor prior to the introduction thereof into the treating chamber 117. For example, the diluent may be introduced into vessel 129 through tube 130 while the treating vapor is introduced through tube 131, and/or the diluent may be introduced into the vapor just prior to its entry into chamber 117 through tube 132. Preferably, the diluent is introduced at both points to provide closer control of the concentration of the treating material.

A modified form of he apparatus of the invention, as shown in FIG. 10, includes a shroud or enclosure 134 which covers the apparatus shown in FIGS. 6 to 9. Shroud 134 has openings 135 at each end to permit the entry and exit of the containers being treated. In addition, a deflector plate 136 extends between angle brackets 137 affixed to sidewalls 118 of sections 114 between the openings 119 and slot 121.

In the performance of the method of the invention with the apparatus shown in FIGS. 6-10, glass containers 111 moving along conveyor belt 112 pass between treating sections 114 and during such passage are subjected to treatment with a vapor, being sprayed from openings 119. The upper portion of the containers 111 extends above the openings 119 and to insure that the treating vapor does not contact the upper portion of the containers, air is drawn into upper chambers 116 through slots 121 and exhausted through ducts 123. As the air is drawn through slots 121, any treating vapor in the vicinity of the upper portions of the containers will be drawn through slots 121 into chambers 116 and exhausted through ducts 123 rather than move upwardly along the surface of the containers 111 into contact with the upper portion thereof.

The treating vapor present in vessel 129 passes through pipes 125–128 and inlets 124 into treating chambers 117 on each side of the containers and is forced through openings 119 into contact with the containers to form a substantially uniform atmosphere in the vicinity of portions thereof.

If it is desired to coat the entire outer surface of the containers, the apparatus shown in FIGS. 6 to 9 may be simply and conveniently modified to provide uniform coating with a minimum amount of material. The apparatus shown in the earlier figures may be enclosed with a shroud 134 as shown in FIG. 10 and a deflector plate 136 inserted in the apparatus and positioned on brackets 137 extending inwardly from the treating sections 114. In the operation of this modified apparatus, containers moving along conveyor belt 112 pass between the treating sections 114 and under a deflector plate 136. The treating vapor being expelled from openings 119 is confined below plate 136 and contacts the entire outer surface of the containers including the upper portion or finish thereof. The excess treating vapor confined by the deflector plate 136 and the sidewalls 118 can only move toward the ends of the apparatus. Since exhaust ducts 123 are continually drawing air into slots 121 of chambers 116, the excess treating vapor reaching the ends of plate 136 is drawn upwardly around the plate into slots 121 and exhausted through chambers 116 and ducts 123.

It was also surprising to discover that glassware which passed through the coating apparatus of the invention after the application of coating had been suspended showed a decrease in the number of defects particularly in the number of bottom checks. It was found that this decrease was the result of a tin oxide coating which had formed on the machine conveyor which advanced the ware through the coating hood. After the coated conveyor had been used for an extended period without replenishing the coating, the meal oxide tended to wear off the surface. However, the coating could be re-formed on the surface by again applying a stannic chloride vapor thereto at a temperature above the decomposition point of the stannic chloride. Thus, even when no coating was applied to the glassware, it was found that the application of the coating to metal surfaces such as the conveyors, etc., which contact the newly-formed glass, provided a substantial reduction in the number of bottom checks and thus provided a higher quality ware than previously attainable. In addition, the employment of coated surfaces on the apparatus facilitated the movement of glass through the various processing steps and thus reduced damage to the ware.

While the use of stannic chloride vapor to form the tin oxide coating on the surfaces which contact the newly-formed glass is particularly advantageous, other decomposable tin compounds in vapor, solution or dispersion form may be employed to coat the metal surfaces.

While the decomposable metal compound advantageously may be applied to the metal surfaces in an enclosed chamber such as a hood with an exhaust when the glass is being coated, a vapor may be mixed with gas and air and burned in a gas flame burner with the flame directed against the surface to be coated when the glass is not being coated. The glass contacting metal surface may be any of a wide variety of shapes and forms including conveyor belts and assemblies, guide rails, bending or deforming surfaces, transfer arms and similar surfaces which contact newly formed glass, i.e., glass at a temperature sufficiently high to cause thermal shocking (about 300° to 1100° F.).

Apparatus suitable for coating the glass contacting surfaces of an article used for contacting hot glass at a temperature such that the glass will thermal shock is shown in FIG. 11 and comprises a vapor generator 151 containing a decomposable metal compound such as liquid stannic chloride and a pressure cylinder 152 of a gas inert to the stannic chloride. Disposed below a conveyor belt 153 is a vapor applicator 154 having a plurality of openings and a burner 155. The burner is supplied from a supply pipe 156. Vapor is supplied to applicator tube 154 from generator 151 through a flexible tube 157. Vapor is formed in generator 151 by introducing the gas from cylinder 152 into the generator through tubes 158 and 159. In combination with the tubes are employed a regulator valve 160, a flow meter 161 and a check valve 162. Generator 151 has an inlet connection 164 and an outlet connection 165. The outlet connection 165 is connected to a T 166 one end of which is connected to tube 157 and the other end to a pipe 168 through which additional inert gas may be introduced to mix with and dilute the vapor. As pointed out above, the gas may be nitrogen, argon, dry air or a similar gas which is inert to the stannic chloride.

In the operation of the apparatus shown in FIG. 11, the burner 155 is ignited to heat the conveyor belt in the area being coated by the hot products of combustion rising upwardly from the burner into contact with the belt surface. Dry gas in cylinder 152 is then released by means of regulator valve 160 and flows through tube 158 past flow meter 161 and check valve 162 through tube 159 into generator 151 containing the decomposable metal compound. In generator 151 the gas mixes with the liquid therein, for example, stannic chloride liquid, to form a vapor which passes from the generator through T 166 and tube 157 to applicator tube 154 which has a plurality of openings therein directed toward the surface of conveyor belt 153. Since the metal compound vapor in tube 157 is under pressure due to pressure cylinder 152, the vapor emitted through the openings in applicator tube 154 moves upwardly in cloudlike form into contact with the portion of the conveyor belt 153 heated by burner 155.

In the embodiment shown in FIG. 12 which is a modification of the apparatus for coating the surfaces which contact hot glass shown in FIG. 11, the vapor is mixed with the combustible gas prior to introduction thereof into the burner 155 by connecting tube 157 to 156. Thus, when the combustible gas mixture is ignited, the vapor therein rises into contact with the hot conveyor belt surface and decomposes thereon to form a tightly adherent metal oxide coating.

The invention will be described in greater detail with reference to the following examples. The examples are intended to illustrate the invention and not to restrict the scope of the invention. In the examples, percentages are by weight.

EXAMPLE I

Stannic chloride vapor formed by bubbling argon from a pressure cylinder at a rate of about 1 cubic foot per hour through a vaporizer containing liquid stannic chloride at a temperature of about 110° F. was combined with a stream of argon having a flow rate of about 80 cubic feet per hour to form a vapor containing about 0.5% stannic chloride. The resulting vapor was sprayed onto the outer surface of a series of newly-formed 5-ounce baby food jars as they passed on a conveyor from a forming machine to an annealing lehr. The temperature of the jars during the coating operation was approximately 1050° F. The coating was accomplished in an open ended hood of the type shown in FIG. 4 of the drawings with an exhaust to remove any objectionable decomposition products. After being coated, the jars were passed through the annealing lehr and then permitted to cool. The coating on the jars was colorless and practically invisible to the eye.

Samples of the coated jars were selected and control samples were also selected from uncoated jars which were made immediately preceding and succeeding the coated jars. The coated jars had a coefficient of friction of about one-third that of uncoated jars. Labels were applied to samples of the coated jars and found to adhere tightly even after steam treatment for about 20 minutes.

The jars were used in a processing line in which each jar was filled. Jamming of the processing line due to breakage or falling down of jars was greatly reduced with the coated jars as compared with uncoated jars.

The coefficient of friction of the coated and uncoated jars after processing was checked again, and it was found that the coated jars had the same low coefficient of friction as before processing.

EXAMPLE II

The procedure of this example was the same as that of Example I, except that the stannic chloride vapor contained about 0.1% stannic chloride. Glass jars coated with this vapor showed superiorities over uncoated jars similar to those exhibited by the coated jars of Example I.

EXAMPLE III

The procedure of this example was the same as that of Example I, except that the temperature of the stannic chloride liquid was about 90° F., and air having a dew point below about −40° F. was employed in forming a concentrated vapor. Also, ordinary compressed air was mixed with the concentrated vapor in the hood as a diluent. The vapor employed in the coating of the jars contained about 0.3% stannic chloride in air calculated on the flow rates of the vapor and diluent. Jars coated with the above vapor exhibited improved lubricity and strength similar to the coated jars of Example I.

EXAMPLE IV

Eleven ounce capacity amber bottles of the one-trip type being conveyed from a forming machine to a lehr on a machine conveyor at a rate of about 144 per minute were passed through a stainless steel hood approximately thirty inches long. The hood was of the double-wall type and had a series of openings in each of the inner sidewalls of the hood. One cubic foot per hour of argon gas was introduced into a vessel containing stannic chloride liquid at a temperature of approximately 120° F. The resulting vapor was mixed with a diluent flow of argon of about 60 cubic feet per hour to form a vapor which was delivered to the hood and used to coat the beer bottles. After the bottles had been so coated, the bottles were passed through an annealing lehr and thereafter coated with a commercially available stearate coating composition. The stearate composition was a 0.1% aqueous solution of polyoxyethylene monostearate sold by Atlas Powder Company as MYRJ-52S. The bottles were at a temperature of about 250° F. when sprayed with the stearate solution.

Samples of the coated bottles were selected and also control samples were selected from uncoated bottles which were made immediately preceding and succeeding the coated bottles.

The bottles were abraded for one minute in the American Glass Research "line simulator." The line simulator consists of a flat circular bedplate covered with plastic material, which is motor-driven. The bottles to be abraded were placed on the plate near its outer edge between stationary plastic covered guide rails. A spring-mounted "gate" protrudes through the guide rails at one point to interrupt the movement of the bottles as the bedplate rotates. Release from the gate allows the bottles to impact. While the "gate" bar is normally covered with rubber, in the abrasion test conducted, the rubber covering was replaced with a half-round cold rolled steel surface, one-half inch in diameter. This replacement was made on the recommendation of American Glass Research to provide greater abrasion of the mid-sidewall of the bottles than would normally occur, since the bottle design had a protruding shoulder and heel which in conventional tests would prevent contact of the sidewalls of the bottles. Abrasion on the mid-sidewall of the bottle has a more pronounced effect on pressure strength than does comparable abrasion of a heavy heel or shoulder. After being abraded, the bottles were tested for pressure strength and it was found that the coated bottles had an average pressure strength approximately 15% greater than bottles which had been coated only with the stearate.

EXAMPLE V

The procedure of this example was the same as that of Example I, except that instead of coating glass jars, the vapor was sprayed onto a moving grid-type steel conveyor belt used to transfer newly formed glassware from a forming machine to an annealing lehr. No glassware was on the belt during the coating operation. The temperature of the belt in the hood during the ten-minute coating operation was maintained at approximately 1050° F. by the use of a supplemental gas burner directed against the belt.

After being coated, the conveyor was operated for four hours transferring newly formed uncoated glass jars from a forming machine to an annealing lehr. After annealing, the jars were inspected to determine the presence of flaws in the bottom portions of the jars. It was found that the number of flaws in the jars transferred by the coated conveyor was about 50% less than the defects present in an equivalent number of jars transferred by the same conveyor belt prior to being coated with tin oxide.

EXAMPLE VI

An applicator tube was placed under a machine conveyor belt associated with a glass forming machine which carries glass containers from the forming machine to an annealing lehr in a manner similar to the arrangement shown in FIG. 11 of the drawings. The applicator tube consisted of a one-fourth inch diameter nipple approximately 5½ inches long in which five No. 37 holes had been drilled in the upper surface thereof. A gas burner was placed under the applicator tube and the gas ignited so that a portion of the conveyor belt was heated to a temperature of about 1000° F. At the same time nitrogen gas under a pressure of seven pounds per square inch was delivered at a rate of one cubic foot per hour into a vessel containing stannic chloride liquid. The stannic chloride vapor formed was emitted from the applicator tube and moved upwardly to surround the heated portion of the conveyor belt. The moving belt was continuously coated while the belt was transferring newly formed uncoated glass quart capacity soft drink bottles from the forming machine to an annealing lehr. After annealing, the bottles were inspected to determine the presence of flaws in the bottom portions of the bottles, and it was found that the number of flaws was substantially reduced as compared with an equivalent number of bottles transferred by the same conveyor belt prior to being coated with tin oxide.

EXAMPLE VII

The procedure of this example was the same as that of Example V, except that the stannic chloride vapor sprayed onto the conveyor belt was replaced with a solution containing 5% stannous chloride and 1% hydrochloric acid in water. The coated conveyor belt showed superiorities to the uncoated belt similar to those exhibited by the belts of Examples V and VI.

The above description, drawings, and specific examples show that the present invention provides a new and improved coating for glass of improved durability and lubricity. Moreover, the durability of the coating of the invention is such that the film formed on the glass surface can withstand severe food processing treatments with hot water and steam. Furthermore, the coated glass articles of the invention retain substantially their original appearance, and labels adhere tightly to the coated surfaces. In addition, breakage and other damage and defects of the coated articles are significntly reduced. Also, the coating is approved for use with food containers. The apparatus of the invention provides a simple and convenient means for applying a uniform coating to glass articles with the minimum of material. Also, the design of the apparatus permits fabrication from commerically available components at relatively low cost. Moreover, the method of the invention provides a simple procedure for uniformly coating glass articles with a colorless film which is substantially invisible to the eye. Further, the invention provides an improved method and apparatus for coating articles which contact newly formed glass.

It will be apparent from the above description and drawings that various modifications in the specific compositions, procedures and apparatus described in detail may be made within the scope of the invention. Therefore, the invention is not intended to be limited to the particular designs, procedures and formulations except as may be required by the following claims.

What is claimed is:

1. A method for forming a coating on selected portions of a glass container, comprising forming an atmosphere of a pyrolytically decomposable treatment gas, introducing the treatment gas into a treatment volume through inlet ports and exhausting the treatment gas through exhaust means whereby a flow pattern from the inlet ports to the exhaust means is established which flow pattern is confined substantially to the treatment volume, passing a glass container at a temperature above the decomposition temperature of the treatment gas through the treatmtent volume with a portion of the container protruding outside of the treatment volume, forming a coating on the portion of the container within the treatment volume from the decomposition products of the treatment gas, and removing the container from the treatment volume, whereby the protruding portion of the bottle is protected from the coating and the container is coated in the desired selected portions.

2. A method as set forth in claim 1 which comprises forming the treatment gas of stannic chloride by passing a moisture-free gas through stannic chloride.

3. A method of reducing surface checks in glass articles which are supported on a metal surface after forming and prior to annealing thereof, comprising forming a tightly adherent tin oxide coating on a metal surface to be employed in contact with said glass article by conducting a decomposable stannic chloride compound to said metal surface and heating said compound to a temperature above the decomposition point thereof to form a tin oxide coating on said surface.

4. A method of reducing surface checks in hot glass articles comprising receiving the glass articles upon a surface of a metal conveyor, at least periodically applying a decomposable tin compound vapor to said surface and maintaining the portion of said surface contacted by said vapor above the decomposition point of the compound by contacting said surface with products of combustion whereby a tin oxide coating is formed upon said surface and the frequency of shocking the glass is reduced.

5. Apparatus for treating newly formed vitreous articles comprising an at least partially enclosed chamber having an article inlet portion, an article outlet portion and an opening at the top thereof to permit portions of articles passing therethrough to extend beyond said chamber, means for generating a vapor of a pyrolytically decomposable treatment gas, means for conducting said treatment gas into said chamber, means for preventing said treatment gas from passing from said chamber through said opening, and means for moving said articles through said chamber, whereby said articles may be moved through said chamber with a portion thereof protruding from the opening in the top of said chamber and protected from said treatment gas while the article portion in said chamber is exposed to said treatment gas and is accordingly coated with the pyrolytic decomposition products of said treatment gas.

6. Apparatus for treating newly formed glass containers comprising an at least partially enclosed chamber defined by a treatment hood, exhaust means, a conveyor belt, and means for generating a pyrolytically decomposable treatment gas, said conveyor belt passing through said chamber, said chamber having an opening therein above said belt and aligned with the entrance and exit locations of said belt into and out of said chamber, said treatment gas generating means being connected to said chamber through inlet ports defined in said chamber to provide a treatment gas-rich atmosphere in said chamber, said chamber also having at least one exhaust port connected to said exhaust means to induce and control the flow of said treatment gas-rich atmosphere from said inlet ports to said exhaust port through only a selected portion of the interior of said chamber whereby only selected areas of containers passing through said chamber may be treated by the induced flow of treatment gas-rich atmosphere.

7. Apparatus according to claim 6 in which an opening is defined along the top of said chamber over said belt.

8. Apparatus according to claim 7 in which said exhaust ports are located along said top opening to prevent escape of the treatment gas-rich atmosphere therethrough.

References Cited
UNITED STATES PATENTS

| | | | |
|---|---|---|---|
| 2,699,415 | 6/1957 | Nachtman | 65—3X |
| 3,005,731 | 10/1961 | Payne, Jr. | 117—211 |
| 3,044,903 | 7/1962 | Skoog | 117—106X |
| 3,093,508 | 6/1963 | Wartenberg | 65—60UX |
| 3,113,039 | 12/1963 | Podzuweit | 117—106 |
| 2,478,817 | 8/1949 | Gaiser | 65—60X |
| 2,698,812 | 1/1955 | Schladitz | 65—60X |
| 3,188,230 | 6/1965 | Bakish et al. | 118—48 |
| 2,375,482 | 5/1945 | Lyle | 118—49 |

S. LEON BASHORE, Primary Examiner

J. H. HARMAN, Assistant Examiner

U.S. Cl. X.R.

65—30; 117—106, 124; 118—48, 49